UNITED STATES PATENT OFFICE.

IENS P. LIHME, OF CLEVELAND, OHIO, ASSIGNOR TO THE GRASSELLI CHEMICAL COMPANY, OF CLEVELAND, OHIO, A CORPORATION OF OHIO.

NON-DARKENING LITHOPONE AND PROCESS OF MAKING THE SAME.

No. 883,142.  Specification of Letters Patent.  Patented March 24, 1908.

Application filed December 11, 1905. Serial No. 291,225.

*To all whom it may concern:*

Be it known that I, IENS P. LIHME, a citizen of the United States of America, and a resident of Cleveland, in the county of Cuyahoga and State of Ohio, have invented certain new and useful Improvements in Non-Darkening Lithopones and Processes of Making the Same, of which the following is a specification.

My invention relates to improvements in a non-darkening lithopone and process of making the same, and has for its object the production of a lithopone, which will not change color or be reduced under conditions of exposure to sunlight and moisture. All lithopones now on the market contain impurities, which, as I believe, are reduced under the foregoing named conditions and deposit metallic zinc in minute quantities, thus giving the pigment a slaty gray or darkened tint. In consequence, lithopone, although well adapted for use in the painting trade, is undesirable for use as a body for manufacturing white-paints, and I have sought to avoid this practically prohibitive feature.

In my prior application, Ser. No. 289,238, filed November 27th, 1905, I have explained my discovery and theory more in detail and one method of overcoming the above referred to tendency of lithopone to reduce. Herein I shall explain another mode of producing a non-darkening lithopone, which I have found desirable to practice commercially. Theoretically, lithopone is a mixture comprising one molecular weight of barium sulfate and one of zinc sulfid, but as manufactured commercially, various impurities necessarily are present and must be dealt with, if harmful to the completed product. Solutions of the two precipitating salts, barium sulfid and zinc sulfate, are made up to contain known weights thereof. In the latter solution, discoloring impurities, which are principally iron and manganese in combination, will almost inevitably be found, which are precipitated out by chlorination. This introduces a small amount of zinc chlorid, while the barium solution contains such impurities as hydroxid, sulfite and hyposulfite. These two commercial solutions are mixed together, a small percentage of sodium chlorid preferably being previously added to the zinc sulfate in order to make the resulting precipitate more flocculent. The theoretical reaction is as follows:

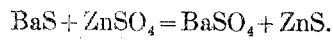

$$BaS + ZnSO_4 = BaSO_4 + ZnS.$$

This precipitate, principally lithopone, is collected in a filter-press and dried at about 200° Fahrenheit, after which the material is thrown into a muffle and treated at red-heat for about one and one-half hours; ammonium chlorid being added from time to time for the purpose of preventing, as far as possible, the action of oxygen upon the zinc sulfid. As a matter of fact, however, some of the zinc sulfid is converted into sulfurous gas and zinc oxid. The sulfurous gas reacts in turn upon the barium hydroxid to form barium sulfite in accordance with the reaction indicated below:—

$$SO_2 + Ba(OH)_2 = BaSO_3 + H_2O.$$

In addition to this, the very high temperature in the muffle necessarily decomposes some of the ammonium chlorid into hydrochloric acid and ammonium gas; the hydrochloric acid acting upon the zinc oxid, and this in turn, at the high temperature, is converted into basic zinc chlorid;—$ZnCl_2(ZnO)_3$, which is demonstrated to be present, since it is insoluble in water. The above, as I believe, indicate the reactions which form the objectionable impurities in the lithopone.

It is my best judgment, based upon a long series of experiments, that it is the barium sulfite, when brought into combination with the basic zinc chlorid, which causes the darkening of lithopone; the first under the influence of the sun and in the presence of moisture, probably being first reduced to the form of bi-sulfite, and this reacting on the basic zinc chlorid causes the reduction of the metallic zinc, probably in accordance with this formula:—

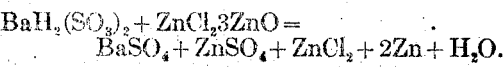

$$BaH_2(SO_3)_2 + ZnCl_2 3ZnO = \\ BaSO_4 + ZnSO_4 + ZnCl_2 + 2Zn + H_2O.$$

My experiments have shown that a neutral mixture of lithopone and water gives an acid reaction, when the change of color takes place in the presence of strong sunlight. Having ascertained what appears to be the true cause of this undesirable reaction, I have sought to provide simple means for preventing its occurrence in the completed product. Accordingly, I add to the lithopone at any suitable stage during the process a salt or reagent, which will prevent the occurrence of undesirable reactions, causing a darkening of the lithopone.

After the product has been removed from the muffle and dumped into vats of water to wash out any soluble impurities, I may add the reagent in sufficient quantities, corresponding to the amount of undesirable impurities present, during the ensuing process of filtration. To obviate the darkening reaction, accordingly, I add to my lithopone, immediately before the last filtration, a small amount of caustic soda and a varying amount of nitrate of ammonium, or of other suitable nitrates or oxidizing agents. This will leave with the completed lithopone a sufficient amount of such oxidizing agent, as to obviate any tendency of the zinc compounds to reduce, and the result will be a thoroughly satisfactory lithopone, which will admirably serve as a body for white paints. As will be understood, any suitable nitrate, such as ammonium, barium, sodium or potassium, will act strongly as an oxidizing agent in the presence of any free acid. The treated product is completed in the usual manner, being collected in the filter-press, dried, milled and bolted through silk screens, after which it is ready for the market.

Although I have described the addition of the preferred oxidizing agent in the form of a solution, the amount being dependent upon the volume of undesirable impurities, it will be apparent that a very finely pulverized nitrate or other oxidizing agent may be added in a dry state during the latter steps of the process of preparing the lithopone in its commercial form. Accordingly, I do not desire to be understood as restricting my invention to the precise steps above outlined, nor do I intend to assert that there may not be other causes for the darkening of the lithopone, but my present invention seeks to obviate this tendency by adding a suitable reagent to prevent the occurrence of reactions in the completed article, when exposed to sunlight and moisture.

Having now set forth a process for manufacturing a non-darkening and highly purified commercial lithopone, I claim as new and desire to secure by Letters Patent, the following:—

1. The process of manufacturing a non-darkening lithopone, which consists in adding to the lithopone a soluble nitrate for preventing reaction among the impurities present, substantially as set forth.

2. The process of manufacturing a non-darkening lithopone, which consists in preparing in solution commercial barium sulfid and zinc sulfate, purifying and mixing the solutions, muffling the product and adding thereto a soluble nitrate for preventing reaction among the impurities, substantially as set forth.

3. A commercial lithopone, comprising a mixture of barium sulfate, zinc sulfid and a soluble nitrate; the latter being present in quantities corresponding to the reacting or darkening impurities, substantially as set forth.

Signed at Cleveland, this ninth day of December, 1905, in the presence of two subscribing witnesses.

IENS P. LIHME.

Witnesses:
FRANCIS H. ECKHARDT,
G. E. FISHER.